United States Patent
Douglass et al.

(10) Patent No.: US 7,710,635 B2
(45) Date of Patent: *May 4, 2010

(54) SYSTEM AND METHOD FOR HINGE MEMORY MITIGATION

(75) Inventors: Michael R. Douglass, Plano, TX (US); Andrew B. Sontheimer, Plano, TX (US); David J. Mehrl, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/047,557

(22) Filed: Mar. 13, 2008

(65) Prior Publication Data

US 2009/0231674 A1    Sep. 17, 2009

Related U.S. Application Data

(62) Division of application No. 11/511,976, filed on Aug. 29, 2006, now Pat. No. 7,349,146.

(51) Int. Cl.
G02B 26/00    (2006.01)
(52) U.S. Cl. .................. 359/292; 359/290; 359/291
(58) Field of Classification Search ............ 235/462.36, 235/462.43; 345/84, 85; 359/198, 224, 290, 359/291, 295
See application file for complete search history.

(56) References Cited

U.S. PATENT DOCUMENTS

| 6,204,085 | B1 | 3/2001 | Strumpell et al. |
| 6,885,493 | B2 | 4/2005 | Ljungblad et al. |
| 7,183,618 | B2 | 2/2007 | Ishii |
| 7,349,146 | B1 * | 3/2008 | Douglass et al. ............ 359/292 |
| 2005/0147750 | A1 | 7/2005 | Jacobs et al. |

* cited by examiner

*Primary Examiner*—David N Spector
(74) *Attorney, Agent, or Firm*—Charles A. Brill; Wade James Brady, III; Frederick J. Telecky, Jr.

(57) ABSTRACT

System and method for reducing failures due to hinge memory in a microdisplay display system. A preferred embodiment includes setting the state of each micromirror in a digital micromirror device based on an image being displayed, recording a usage history for the micromirrors, and providing a sequence of states to each micromirror when the display system is in an inactive mode. The sequence of states provided to a micromirror is based on the micromirror's usage history. The operation of the micromirrors while a display system containing the digital micromirror device is not in active use can help to reverse or eliminate hinge memory, thereby extending the lifetime of the digital micromirror device.

18 Claims, 4 Drawing Sheets

SYSTEM AND METHOD FOR HINGE MEMORY MITIGATION

This application is a divisional of application Ser. No. 11/511,976, filed 29 Aug. 2006, now U.S. Pat. No. 7,349,146.

TECHNICAL FIELD

The present invention relates generally to a system and method for display systems, and more particularly to a system and method for reducing failures due to hinge memory in a microdisplay display system.

BACKGROUND

A microdisplay display system utilizes an array of spatial light modulators (the microdisplay) to modulate light in order to display images on a display plane. The microdisplay can modulate light by reflectively altering the transmission path of the light or blocking the transmission path of the light. Microdisplay display systems have enabled the production of high quality display systems at a reasonable cost.

One widely used form of microdisplay is a digital micromirror device (DMD). A DMD is made up of an array of hundreds of thousands of micromirrors that pivot along a common axis depending upon an image being displayed. A single image can be divided into a number of bit planes, which when displayed sequentially, are integrated by the human eye into a single image. There are multiple bit planes for each color of light in the microdisplay display system. An individual micromirror can assume one of two states, ON or OFF. When a micromirror is in an ON state, the micromirror can reflect light from a light source onto the display plane, while when the micromirror is in an OFF state, the light is reflected away from the display plane. The combined effect of all the micromirrors in the microdisplay, in conjunction with sequentially colored light, produces images on the display plane.

With reference now to FIGS. 1a and 1b, there are shown diagrams illustrating two commonly used forms of micromirrors. The diagram shown in FIG. 1a illustrates what is commonly referred to as a yokeless micromirror 100 and the diagram shown in FIG. 1b illustrates a yoked micromirror 150. The yokeless micromirror 100 includes a mirror 105 that is attached to a hinge 110, with the entirety resting on a hinge support structure 115. The mirror 105 pivots about the hinge 110 based on image data of the image being displayed. The yoked micromirror 150 also includes a mirror 155 that is attached to a yoke 160. The yoke 160 is attached to the hinge 165. Both the mirror 155 and the yoke 160 pivot about the hinge 165.

With reference now to FIGS. 2a through 2d, there are shown diagrams illustrating potential micromirror positions. When in normal operation, a micromirror 200 can be in one of two positions, a first position that corresponds to an ON position and a second position that corresponds to an OFF position. The diagram shown in FIG. 2a illustrates one of the two positions. When another bit plane is to be displayed, the micromirror can be commanded to move to a reset position. The diagram shown in FIG. 2b illustrates the reset position. Once in the reset position, the micromirror can move to either the ON position or the OFF position depending on the value of the image data. The diagrams shown in FIGS. 2c and 2d illustrate the ON position and the OFF position.

As the micromirror (mirror) 105 moves, a torque is applied to the hinge 110 in the same direction as the movement of the micromirror 105. If the micromirror 105 is operated in such a way that the micromirror 105 predominantly moves towards one side (one position, either ON or OFF), an effect known as hinge memory can occur. Hinge memory can be the result of the migration of the hinge material and if allowed to persist for an extended amount of time, can be a cause of a catastrophic failure of the micromirror 105. For example, in displaying an all black (or an all white) image, the micromirrors of the microdisplay will spend a vast majority of the time (greater than 95%) in a single position. Practical examples would include the superposition of a black box containing a close-caption text stream over the image in a television or an information display panel with text on a dark background.

The behavior of the micromirror 105 can be described by its duty cycle. The duty cycle describes the percentage of the time the micromirror 105 moves to a given position. For example, a 5/95 duty cycle means that 5% of the time, the micromirror 105 lands on a first position and 95% of the time, the micromirror 105 lands on a second position. As the duty cycle approaches 50/50, the micromirror 105 will have less hinge memory. For example, with a duty cycle of 50/50, the micromirror 105 generally will have no hinge memory (assuming that there was no initial hinge memory) since half of the time, the micromirror 105 is in the first position and half of the time, the micromirror 105 is in the second position.

The continued use of the microdisplay display system with a large disparity in the behavior (expressed as duty cycle) of the micromirror 105 over an extended period of time can result in a failure of the micromirror 105 by preventing the micromirror from changing position should a need to do so arise.

Similar problems exist in other display system technologies, such as degradation of phosphor screens in cathode ray tubes (CRT), erosion of electrodes in plasma screens, and degradation of polarizers in liquid crystal displays (LCD).

SUMMARY OF THE INVENTION

These and other problems are generally solved or circumvented, and technical advantages are generally achieved, by preferred embodiments of the present invention which provides a system and a method for reducing failures due to hinge memory in a microdisplay display system.

In accordance with a preferred embodiment of the present invention, a method for reducing hinge memory in a display device is provided. The method includes operating each picture element in the display device with a specified duty cycle while the display device is in an inactive period. The duty cycle specifies a ratio of a number of times that a picture element is in a first state to a number of times that the picture element is in a second state.

In accordance with another preferred embodiment of the present invention, a method for operating a digital micromirror device based display system is provided. The method includes setting the state of each micromirror in the digital micromirror device based on an image being displayed, recording a usage history for each micromirror, and providing a sequence of states to each micromirror in response to a determination that the display system is in an inactive mode, with the sequence of states provided to the micromirror being based on the micromirror's usage history.

In accordance with another preferred embodiment of the present invention, a display system is provided. The display system includes a light source, an array of light modulators optically coupled to the light source, a controller coupled to the array of light modulators, and a memory coupled to the controller. The array of light modulators modulate light from the light source based upon image data to produce images on a display plane, and the memory stores usage history for each light modulators in the array of light modulators as well as sequences of light modulator states for use in reversing hinge memory. The controller includes a means for determining when to initiate the reversal of hinge memory and a means for providing a sequence of micromirror states with a specified duty cycle to a light modulator in the array of light modulators when the display system is in an inactive mode.

An advantage of a preferred embodiment of the present invention is that it is inexpensive and easy to implement in microdisplay display systems. The present invention can be utilized while the microdisplay display systems are not being used and consume very little electricity. Therefore, a significant increase in product life can be achieved with very little investment.

A further advantage of a preferred embodiment of the present invention is that it is effective in reducing and potentially eliminating hinge memory. Significant reductions in hinge memory can be achieved with short applications of the present invention. Therefore, extended periods of microdisplay display system downtime are not needed to implement the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
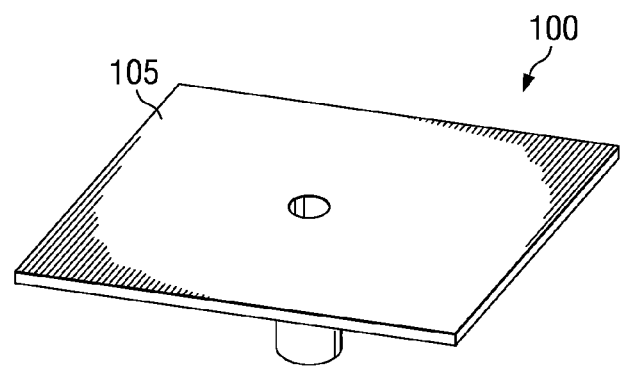
FIGS. 1a and 1b are diagrams of exemplary micromirrors.
Figure 1A:
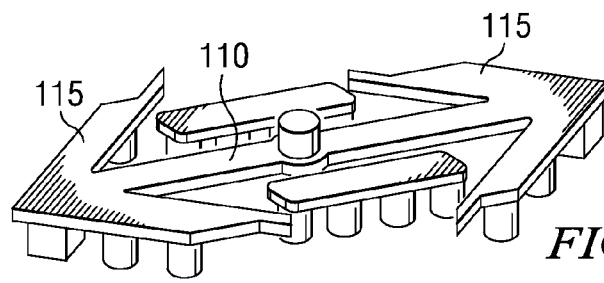
Figure 1B:
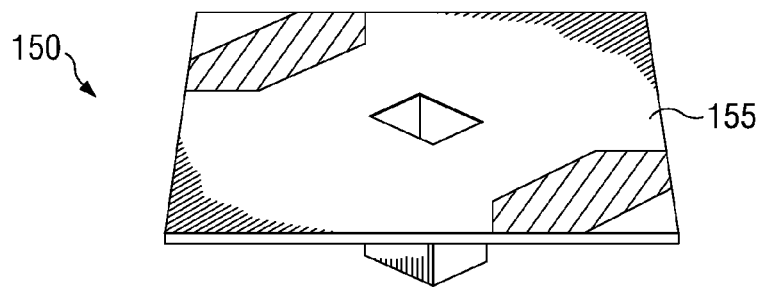
Figure 1B:
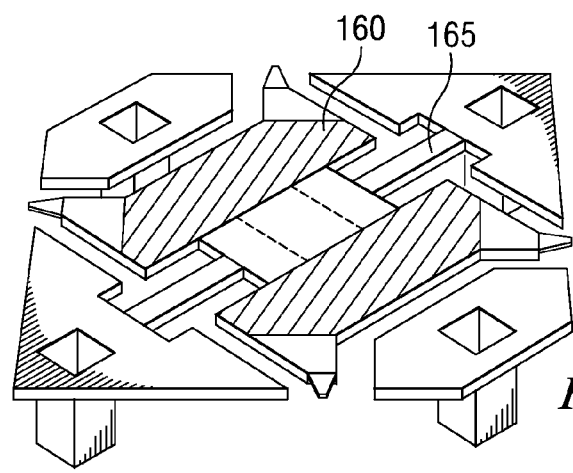
Figure 2A:
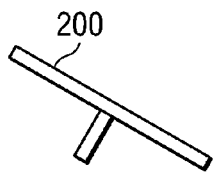
FIGS. 2a through 2d are diagrams of potential micromirror positions.
Figure 2B:
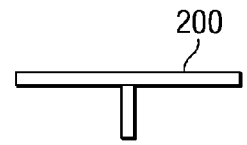
Figure 2C:
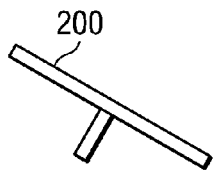
Figure 2D:
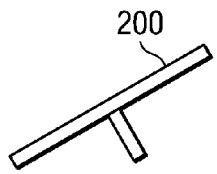

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a microdisplay display system utilizing a digital micromirror device. The invention may also be applied, however, to other micro electrical mechanical systems (MEMS) that can perform repetitive operations. Additionally, the present invention can be applied to other types of display systems, such as plasma display systems, wherein pixel usage can be tracked and the usage information can be used to help reduce the effects of pixel burn-in, for example.

Hinge memory in a DMD can be reversed as long as a catastrophic failure has not occurred. If reversed, the DMD will perform as if it never had hinge memory. For display systems utilizing other technologies, such as plasma, LCD, CRT, and so forth, it is possible to reverse the visual effects of the degradation due to unbalanced use. However, the displays may be permanently damaged by the unbalanced use. For example, in a CRT, once the phosphor layer has been burned, generally it is not possible to repair the phosphor layer. However, it may be possible to burn the remaining phosphor to minimize the visual effects of the damaged portions of the phosphor layer. Similarly, the good pixels of a plasma display can be burned to minimize the visibility of the damaged pixels.

Although the discussion of the present invention focuses on the reversal of hinge memory for a DMD, the present invention can be readily modified for use with other types of display technology by those of ordinary skill in the art of the present invention. Therefore, the discussion presented herein should not be construed as being limiting to either the scope or the spirit of the present invention.

Several factors can contribute to hinge memory, including the duty cycle of the micromirrors, the continuous operating time of the micromirrors, the operating temperature of the micromirrors, and so on. A display system operating at a low temperature will develop less hinge memory than a display system operating at a high temperature, given that other factors contributing to hinge memory remain consistent between both display systems. Fortunately, until complete hinge failure occurs, wherein the micromirror can no longer move due to hinge memory, the effects of hinge memory generally can be reversed.

With reference now to FIGS. 3a through 3d, there are shown diagrams illustrating techniques to reverse hinge memory, according to a preferred embodiment of the present invention. According to a preferred embodiment of the present invention, the techniques for reversing hinge memory can be utilized when the display system is not being used. For example, the techniques can be used when the display system is powered down, such as late at night in a public area when the public area is closed, and so forth. When the display system is not being used to display information, the light source can be powered down and the hinge memory reversal techniques can be applied.

Figure 3A:
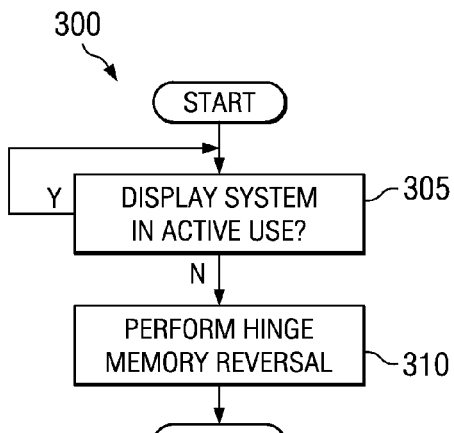
FIGS. 3a through 3d are diagrams of techniques for reversing hinge memory, according to a preferred embodiment of the present invention.

The diagram shown in FIG. 3a illustrates a sequence of events 300 in the reversing of hinge memory in a microdisplay display system that makes use of a DMD. The reversal of hinge memory can begin when the microdisplay display system is not in active use. This is required since the reversing of hinge memory effects can require the use of the micromirrors in the microdisplay to display seemingly random noise, which will be meaningless to viewers of the microdisplay display system. A check can be made to determine if the microdisplay display system is in active use (block 305). If the microdisplay display system is in active use, then the technique for reversing hinge memory cannot be used. If the microdisplay display system is not in active use, then reversing hinge memory can begin (block 310). Alternatively, the hinge memory reversal can be automatically programmed to begin whenever the microdisplay display system is powered down.

Figure 3B:
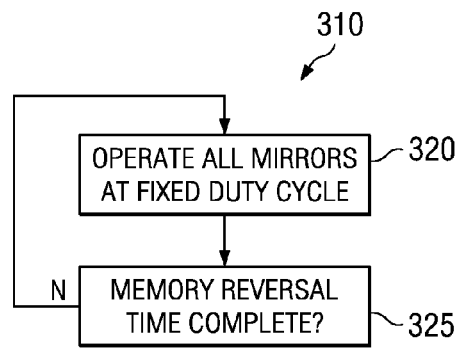
Figure 3C:
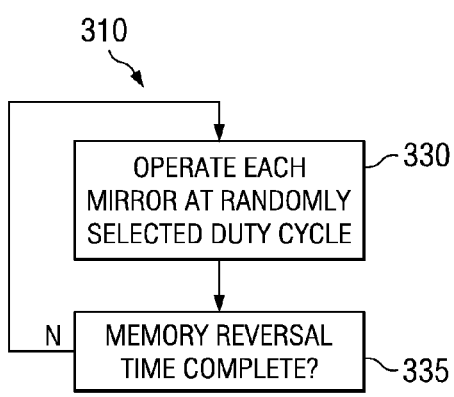
Figure 3D:
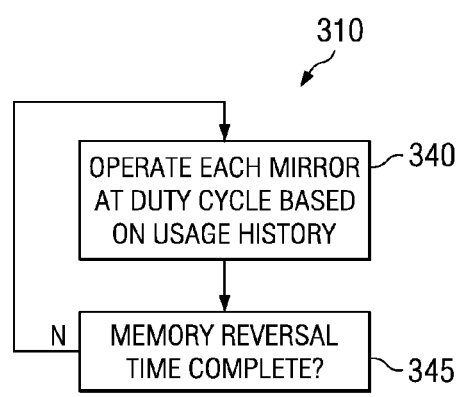

The diagrams shown in FIGS. 3b through 3d illustrate exemplary techniques for achieving the reversal of hinge memory. The techniques, as shown in FIGS. 3b through 3d, can be implementations of the hinge memory reversal 310 shown in FIG. 3a. The diagram shown in FIG. 3b illustrates a first implementation of the hinge memory reversal 310. According to a preferred embodiment of the present invention, the implementation actuates the micromirrors in the microdisplay at a fixed duty cycle (block 320). For example, all of the micromirrors in the microdisplay can be actuated with a 50/50 duty cycle. The actuation of the micromirrors can continue until the time allotted for the hinge memory reversal expires (block 325) or until the microdisplay display device is brought back into active use, whichever comes first.

The implementation of the hinge memory reversal 310 as shown in FIG. 3b is simple and may not require any additional hardware to store sequences to actuate micromirrors, very little additional software, and so forth. Therefore, the present invention can be implemented very inexpensively. However, the use of a single duty cycle for all of the micromirrors in the microdisplay may not be able to reverse the hinge memory as effectively as possible.

The diagram shown in FIG. 3c illustrates a second implementation of the hinge memory reversal 310. According to a preferred embodiment of the present invention, the implementation actuates the micromirrors in the microdisplay with random duty cycles and their complements (block 330). For example, randomly selected micromirrors may be actuated with a 60/40 duty cycle, while other micromirrors are actuated with a 40/60 duty cycle. Depending on implementation, multiple duty cycles can be used. The actuation of the micromirrors can continue until the time allotted for the hinge memory reversal expires (block 335) or until the microdisplay display device is put back into active use, whichever comes first. An advantage in using randomly selected duty cycles is that it is possible to minimize boundary images that may remain if all micromirrors are actuated at the same duty cycle.

The implementation of the hinge memory reversal 310 as shown in FIG. 3c can require a slightly greater investment in hardware and software than the implementation shown in FIG. 3b since more storage may be needed for the different duty cycle sequences as well as more software to perform the random selection of the micromirrors, keep track of the selections, and so forth. Although the implementation as shown in FIG. 3c can help to eliminate boundary images, the reversal of the hinge memory may not be as effective as possible since the actual usage of the individual micromirrors is not considered.

The diagram shown in FIG. 3d illustrates a third implementation of the hinge memory reversal 310. According to a preferred embodiment of the present invention, the implementation actuates the micromirrors in the microdisplay with duty cycles that are the maximum complements to the measured duty cycles of the micromirrors (block 340). For example, if a micromirror has a measured duty cycle of 20/80, then during the hinge memory reversal 310, the micromirror will be actuated with a duty cycle of 100/0, while if the measured duty cycle was 90/10, the micromirror will be actuated with a duty cycle of 0/100. The actuation of the micromirrors can continue until the time allotted for the hinge memory reversal expires (block 345) or until the microdisplay display device is brought back into active use, whichever comes first. An advantage in using a duty cycle that is the maximum complement to the measured duty cycle of the micromirror in actual usage is that it provides the most effective achievable reversal of the hinge memory. If the duty cycle used during the hinge memory reversal 310 is not the maximum complement, then it may not be possible to reverse the hinge memory or it may take an extended amount of time to reverse the hinge memory.

An alternate embodiment of the present invention can involve the actuation of the micromirror with a sequence with a duty cycle that is an actual complement of the measured duty cycle. For example, if a micromirror has a measured duty cycle of 20/80, then during the hinge memory reversal 310, the micromirror would be actuated with a duty cycle of 80/20, while if the measured the duty cycle was 10/90, the micromirror would be actuated with a duty cycle of 90/10.

The implementation of the hinge memory reversal 310 as shown in FIG. 3d can require an investment in hardware and software as well as processing power. A record must be kept of the usage for each micromirror in the microdisplay. Additionally, a significant amount of data processing may be required to maintain the record of the usage of each micromirror. For example, for a high-definition display of resolution 1920×1280, there are over 2.4 million micromirrors (even when utilizing sophisticated image processing techniques to reduce the number of micromirrors, a microdisplay with an effective resolution of 1920×1280 would have over 1.2 million micromirrors), therefore, maintaining usage histories and processing the data to derive the usage histories may severely tax the processing abilities of the microdisplay display system.

The hinge memory reversal can occur while the DMD is being heated. The accumulation of hinge memory and its reversal can be accelerated by elevating the operating temperature of the DMD. The heating of the DMD can be accomplished by using the light of the display system, a dedicated heater or heating element, and so forth. Furthermore, since the effectiveness of the hinge memory reversal can be dependant on the temperature of the DMD, the DMD can be heated to a temperature that is higher than its normal operating temperature to shorten the hinge memory reversal time.

Figure 4A:
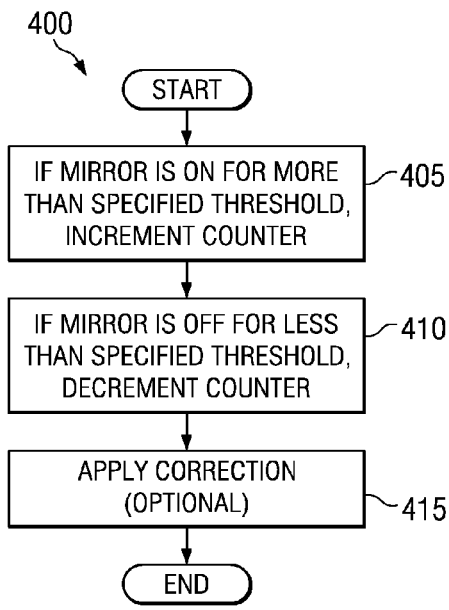
FIGS. 4a and 4b are diagrams of algorithms for maintaining usage histories of micromirrors and for utilizing the usage histories to reverse hinge memory, according to a preferred embodiment of the present invention.
Figure 4B:
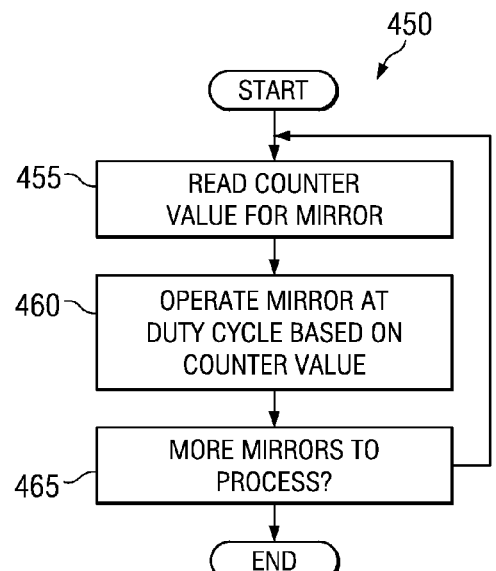

With reference now to FIGS. 4a and 4b, there are shown diagrams illustrating algorithms for maintaining usage histories of each micromirror in a microdisplay and for utilizing the usage histories to reverse hinge memory, according to a preferred embodiment of the present invention. Prior to using the usage histories to reverse hinge memory, the usage histories must be accumulated. One possible technique that can be used to accumulate usage histories for the micromirrors is to amass a running cumulative hinge memory index (CHMI). For each frame (FN) being displayed by the microdisplay, each micromirror (I, J) can be either in an ON state or an OFF state. Using the following definition for S(I, J), the micromirror state:

$S(I, J)=+1$ when micromirror (I, J) is in the ON state, $S(I, J)=-1$ when micromirror (I, J) is in the OFF state, and $S(I, J)=0$ when micromirror (I, J) is in a flat state, then the CHMI for micromirror (I, J) at frame FN can be defined as $$CHMI(FN:I,J) = \sum_{n=1}^{FN} S_n(I,J).$$

The CHMI can then be normalized by dividing CHMI(FN: I,J) by FN, yielding α(FN)=CHMI(FN: I,J)/FN. The normalized CHMI (α(FN)) can then range from −1 for a micromirror that is always in the OFF state to +1 for a micromirror that is always in the ON state. If α(FN) is equal to 0, then the micromirror has spent as much time in the ON state as it has in the OFF state. Therefore, micromirrors with increased potential for hinge memory are the micromirrors with an α(FN) that is closer to −1 or +1. To reverse the hinge memory of the micromirror, the micromirror can be actuated with a duty cycle that corresponds to the inverse of the α(FN). For example if α(FN)=−0.5, then the duty cycle of the actuation of the micromirror used for hinge memory correction should be +0.5.

In order to fully reverse hinge memory, the hinge memory reversal 310 should occur in conditions that are substantially identical to the operating conditions of the microdisplay display system. For example, the operating time should be about the same, as well as the operating temperature, and so forth. However, this may mean that if the microdisplay display device was operated for a week before attempting the hinge memory reversal, then the hinge memory reversal 310 should also run for a week. Fortunately, the more recent states of the micromirror have a more profound effect on hinge memory than previous states that occurred a long time ago. Therefore, it can be possible to assign a weighting to the computation of the CHMI. For example, an exponential weighting can be used. The CHMI can then be expressed as $$CHMI(FN:I,J) = \sum_{n=1}^{FN} (S_n(I,J) * \exp(-(FN-n)/\tau)),$$

where τ is a hinge memory decay constant that can be determined experimentally. Applying the weighted model, the more recent actuations of the micromirror have more effect on the hinge memory of the micromirror. Therefore, a week's worth of use can potentially be reversed by, e.g., a day (or a half-day) of hinge memory reversal.

The hinge memory reversal can further be accelerated by increasing the operating temperature of the microdisplay to a temperature that is greater than the normal operating temperature of the microdisplay. It is therefore possible to accelerate the hinge memory reversal by considering only the most recent actuations of the micromirror and to perform the hinge memory reversal at elevated temperatures.

As discussed previously, the accumulation of every mirror position for each micromirror in a microdisplay for each bit plane of every frame may place an undue burden on the memory system of the microdisplay display system to maintain usage histories for each micromirror as well as moving usage data for each micromirror through the memory system during each frame. Additionally, the processing power needed to update, in a real-time fashion, the CHMI for each micromirror may overwhelm the system resources of the microdisplay display system. However, the phenomenon that causes hinge memory, the display of substantially static patterns (such as closed caption boxes, fixed backgrounds, and so on), lends itself to statistical sampling techniques. By periodically sampling the state of the micromirrors in the microdisplay, the amount of information that needs to be processed can be significantly reduced. The amount of sampling can further be reduced if the sampling were only to occur while the microdisplay is displaying the more significant bit planes. This simplification can be made since the display of the least significant bit planes contribute little to hinge memory since their duration is very short.

Another technique that can be used to reduce the processing requirements is to utilize an average CHMI for a micromirror over an entire video frame. The use of the average CHMI can eliminate sampling difficulties, such as ensuring that every color used in the microdisplay display system is sampled the same number of times. For example, in a four color multiprimary microdisplay display system, each of the four colors generally should be sampled the same number of times or the usage results may be skewed. The average CHMI can encompass the micromirror state for all colors used in the microdisplay display system over a single frame time and can be computed based on an average state of the micromirror over the single frame time. For example, if the average state of the micromirror is ON for 85% of the frame time, then the average CHMI may be incremented. The average state of the micromirror for a single frame time can be provided by high-level software of the microdisplay display system, which can process the video information for a given micromirror and generate necessary sequences to display the video information. The high-level software can readily be modified to provide the average state of the micromirror over the single frame time.

The diagram shown in FIG. 4a illustrates an algorithm 400 for use in accumulating usage data for micromirrors in a microdisplay. Utilizing the average state of a micromirror as provided by high-level software in the microdisplay display system, a comparison of the average state of the micromirror can be compared with a specified threshold and if the micromirror is in the ON state for more than the specified threshold, then a counter representing the usage data for the micromirror can be incremented (block 405), while if the micromirror is in the OFF state for more than the specified threshold, then the counter can be decremented (block 410). According to a preferred embodiment of the present invention, in the interest of reducing memory requirements, the counter can be stored as a single byte value with the value of the counter being represented as a two's complement number. Therefore, the maximum value stored in the counter will be +127 and the minimum value stored in the counter will be −128. If, in the process of incrementing or decrementing the counter, an overflow results, the counter can be kept at its pre-overflow value. After incrementing (block 405) or decrementing (block 410) the counter, an optional correction factor (or weighting factor) can be applied to place emphasis on recent actuations of the micromirror (block 415).

In an exemplary microdisplay capable of displaying images of resolution 800×600 (480,000 pixels) and a 60 Hz frame rate, with a micromirror corresponding to each pixel with a micromirror sample rate of 10 micromirrors per second, it is possible to sample every micromirror in the microdisplay once every 800×600 (1/10)=4800 seconds=80 minutes. The pixel address can be generated by simply incrementing a counter, m, that counts from m=0 to 479,999 and then resets back to zero. The micromirror's row address (I) can be computed as I=integer (counter/600) and the column address (J) can be computed as J=m modulo 600.

Assuming that a particular micromirror is always in the OFF state and that one byte is dedicated to a counter for the micromirror, then the counter will decrement a total of 128 times before it will overflow. It will take 128 samples*80 minutes/sample=700 hours=1 week before the counter will overflow.

The overflow of the counter(s) can be used as a trigger for the hinge memory reversal 310. For example, if a certain number of counters overflow within a certain period of time, then the microdisplay display system can initiate the hinge memory reversal 310 at the next available time. Using the example discussed above, if after two weeks of continuous use, one or two percent of the counters have overflowed, then at the next available time, a hinge memory reversal can be initiated.

The diagram shown in FIG. 4b illustrates an algorithm 450 for use in reversing hinge memory. The algorithm 450 can be an implementation of the hinge memory reversal 310. The hinge memory reversal 310 can begin with a reading of the counter value for a micromirror (block 455). Based on the value of the counter, the micromirror can be actuated with a duty cycle that is complementary to the duty cycle that produced the value of the counter (block 460). For example, if the counter has a value of 0.80, then the associated micromirror should be actuated with a 90/10 duty cycle. In general, with a normalized counter value of Z, the associated micromirror should be actuated with a $(50*(1+Z))/(50*(1-Z))$ duty cycle. The hinge memory reversal 310 should be performed for all micromirrors in the microdisplay (block 465).

Figure 5:
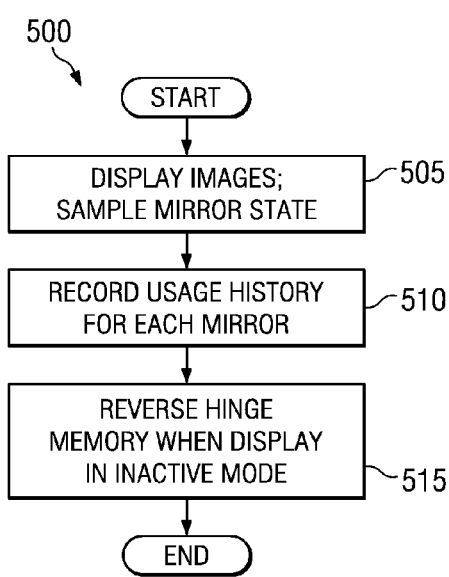
FIG. 5 is a diagram of the operation of a display system with hinge memory reversal capability, according to a preferred embodiment of the present invention.

With reference now to FIG. 5, there is shown a diagram illustrating a sequence of events 500 in the operation of a display system, wherein the display system has a capability to reverse hinge memory, according to a preferred embodiment of the present invention. The sequence of events 500 describes the operation of a DMD-based microdisplay display system. However, the operations described therein can readily be applied to other types of display systems, such as LCD, CRT, plasma, and so forth.

The sequence of events 500 can begin with the display system operating in a normal operating mode, wherein the display system is displaying images. While the display system displays the images, a controller in the display system can be sampling the state of the various micromirrors in the DMD (block 505). Similarly, a controller in a plasma display can sample the states of the pixels in the plasma display. The samples can be processed to record the usage history of the micromirrors (block 510). The sampling and the usage history recording of the micromirrors can be performed using a technique such as the technique described in the discussion of FIG. 4a.

When the display system is in an inactive mode, the hinge memory reversal can take place (block 515). The hinge memory reversal can follow one of the several different hinge memory reversal techniques described in FIGS. 3a through 3d, such as the technique described in FIG. 3d, which specifically makes use of the usage history of the micromirrors in the DMD to optimize the hinge memory reversal.

Figure 6:
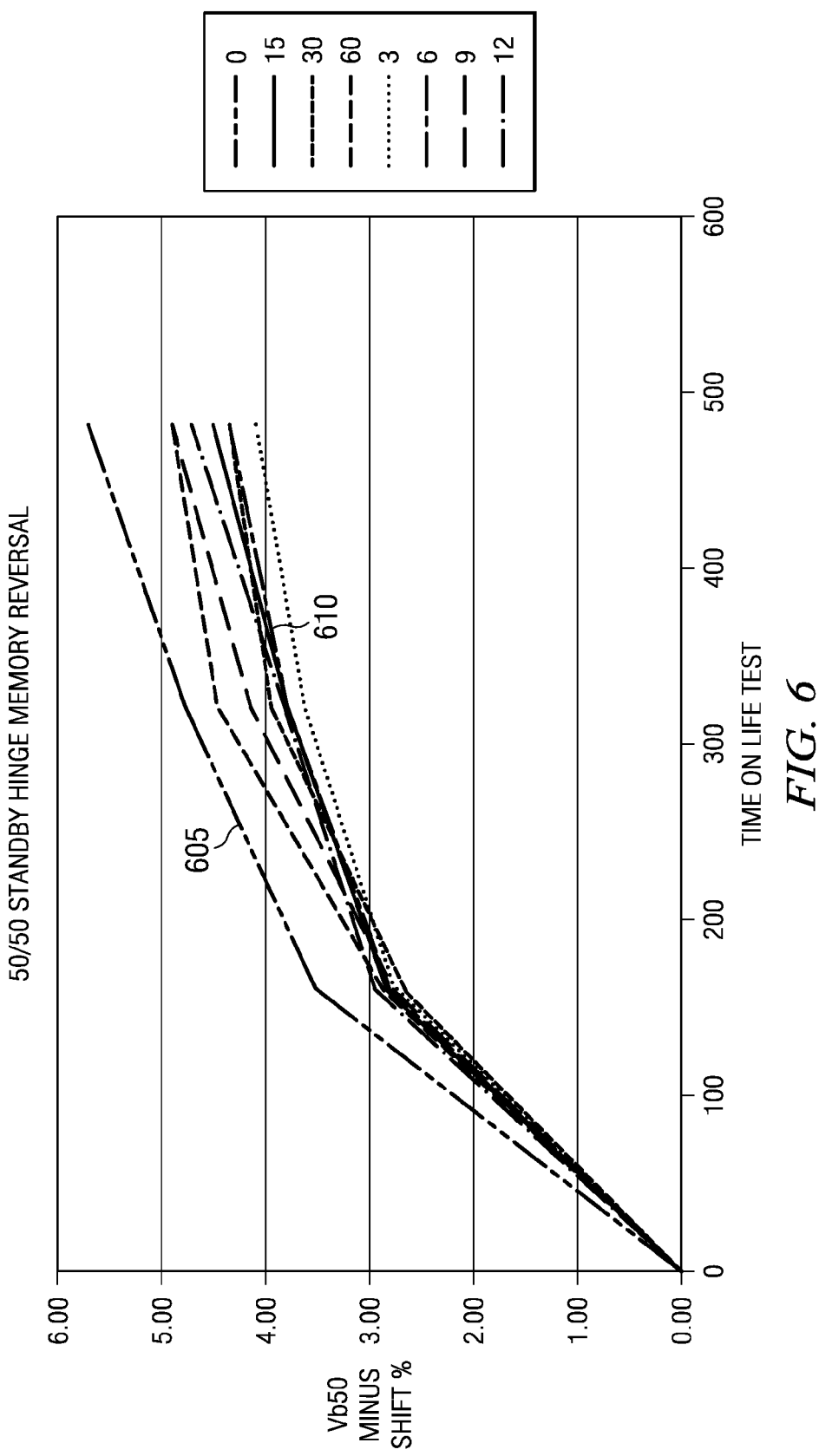
FIG. 6 is a diagram of a data plot of hinge memory versus display system usage time, according to a preferred embodiment of the present invention.

With reference now to FIG. 6, there is shown a data plot illustrating hinge memory reversal effectiveness as a function of time, according to a preferred embodiment of the present invention. The diagram shown in FIG. 6 illustrates a data plot of a voltage that corresponds to the amount of hinge memory present in the micromirror as a function of time, wherein the voltage increases with increased hinge memory. The diagram shows a series of curves, with each curve representing a different hinge memory reversal period after a specified period of normal use. For example, a first curve 605 displays the voltage with a hinge memory reversal period of zero minutes for every 360 minutes of normal use (or no hinge memory reversal) and a second curve 610 displays the voltage with a hinge memory reversal period of six (6) minutes for every 360 minutes of normal use.

The curves shown in FIG. 6 show that in this example, the effect of the hinge memory reversal generally does not significantly increase with extended hinge memory reversal period. This can be due to the effect of operating temperature on the effectiveness of hinge memory reversal. Since a typical implementation of the hinge memory reversal occurs with the light source of the microdisplay display system turned off, a few minutes after the hinge memory reversal begins, the operating temperature of the microdisplay display system cools down to a point wherein the effectiveness of the hinge memory reversal is reduced. Greater hinge memory reversal may be achieved with heating of the microdisplay, as described previously.

Figure 7:
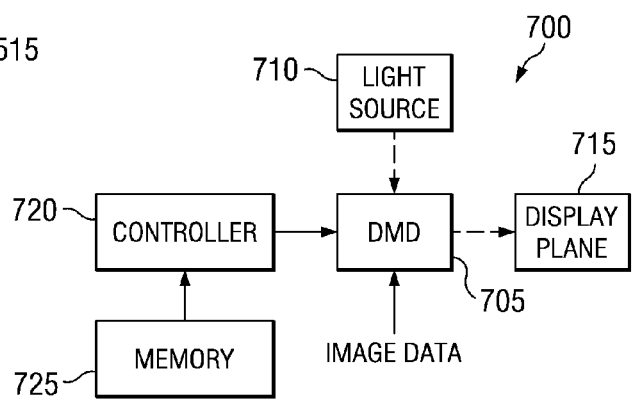
FIG. 7 is a diagram of an exemplary DMD-based display system, according to a preferred embodiment of the present invention.

With reference now to FIG. 7, there is shown a diagram illustrating an exemplary display system 700, wherein the display system 700 utilizes an array of light modulators, specifically a DMD, to modulate light to produce images on a display plane, according to a preferred embodiment of the present invention. Each individual light modulator (a micromirror) in the DMD 705 assumes a state that corresponds to image data for an image being displayed by the display system 700, wherein, depending upon the image data, an individual micromirror can either reflect light from a light source 710 away from or towards a display plane 715. A combination of the reflected light from all of the micromirrors in the DMD 705 produces an image corresponding to the image data. A controller 720 coordinates the loading of the image data into the DMD 705, controlling the light source 710, and so forth. The display system 700 also includes a memory 725 to store the sequences of differing duty cycles for use in reversing hinge memory (or information necessary to generate the sequences), the usage history for the individual micromirrors, and so forth.

The controller 720 can include software applications, functional units, or custom designed dedicated hardware for sampling and accumulating micromirror state, computing CHMI or average CHMI, determining when to initiate hinge memory reversal, computing and/or generating the sequences used to actuate the micromirrors, controlling the physical parameters of the hinge memory reversal (for example, the heating of the DMD, the duration of the hinge memory reversal, and so on), and so forth. For example, the controller 720 can determine that there is a need to perform a hinge memory reversal after a certain percentage of the accumulators of usage history for the micromirrors have experienced overflow or underflow, the display system 700 has been under continuous use for a specified amount of time, the display system 700 has been operating under rigorous conditions (such as at elevated temperatures), or so forth. The controller 720 can then initiate a hinge memory reversal the next time the display system 700 is powered down, placed in an inactive mode, and so on.

Once the hinge memory reversal mode has been initiated, the controller 720 can generate the sequences used to actuate the micromirrors. Depending on the implementation of the hinge memory reversal, a single sequence with a fixed duty cycle can be generated, multiple sequences of with different duty cycles can be generated, or multiple sequences with duty cycles based on each micromirror's usage history can be generated. The controller 720 can then provide the sequences to the micromirrors in the DMD 705.

Descriptions of the DMD, DMD fabrication, and DMD-based display systems can be found in greater detail in the following coassigned U.S. patents: U.S. Pat. No. 4,566,935, issued Jan. 28, 1986, entitled "Spatial Light Modulator and Method," U.S. Pat. No. 4,615,595, issued Oct. 7, 1986, entitled "Frame Addressed Spatial Light Modulator," U.S. Pat. No. 4,662,746, issued May 5, 1987, entitled "Spatial Light Modulator and Method," U.S. Pat. No. 5,061,049, issued Oct. 29, 1991, entitled "Spatial Light Modulator and Method," U.S. Pat. No. 5,083,857, issued Jan. 28, 1992, entitled "Multi-Level Deformable Mirror Device," U.S. Pat. No. 5,096,279, issued Mar. 17, 1992, entitled "Spatial Light Modulator and Method," and U.S. Pat. No. 5,583,688, issued Dec. 10, 1996, entitled "Multi-Level Digital Micromirror Device," which patents are hereby incorporated herein by reference.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reducing hinge memory in a micromechanical device, the method comprising:
    operating each element in the device with a specified duty cycle during an inactive period, wherein the duty cycle specifies a ratio of a number of times that the element is in a first state to a number of times that the element is in a second state.

2. The method of claim 1, wherein the operating occurs while the device is being heated.

3. The method of claim 1, wherein each element in the device is operated with a common duty cycle.

4. The method of claim 1, wherein some elements in the device are operated with different duty cycles.

5. The method of claim 4, wherein a first element is operated with a first duty cycle, and a second element is operated with a maximum complement of the first duty cycle.

6. The method of claim 1, wherein each element in the device is operated with a duty cycle that is based on a usage history of the element.

7. The method of claim 6 further comprising sampling each element's state while the device is in a normal operating mode before the operating each element in the inactive period.

8. The method of claim 1, wherein the device is a digital micromirror device, and wherein the element is a micromirror.

9. A method for operating a device based system, the method comprising:
    setting the state of each element in the device based on the desired operation of the device;
    recording a usage history for each element in the device; and
    providing a sequence of states to each element in response to a determination that the system is in an inactive mode, wherein the sequence of states provided to each element is based on that element's usage history.

10. The method of claim 9, wherein the element can assume one of two states, and wherein the recording comprises incrementing a counter if the element is in a first state and decrementing the counter if the element is in a second state.

11. The method of claim 10, wherein the recording is performed periodically at a lower rate than the element is operated.

12. The method of claim 10, wherein the system provides an average state of each element over a single period, and wherein the recording comprises incrementing the counter if the average state is greater than a first specified threshold and decrementing the counter if the average state is less than a second specified threshold.

13. The method of claim 10, wherein the counter has a maximum value and a minimum value, wherein the recording can result in the counter overflowing the maximum value or underflowing the minimum value, wherein if an overflow or an underflow occurs, the counter maintains its old value, and wherein the system is placed in the inactive mode when a predetermined number of counters overflow or underflow.

14. The method of claim 9, wherein the recording comprises sampling the state of each element at a rate that is substantially less than an operational rate of the system.

15. A display system comprising:
    a light source;
    an array of light modulators optically coupled to the light source, the array of light modulators configured to modulate light from the light source based upon image data to produce images on a plane;
    a controller coupled to the array of light modulators, the controller operable to determine when to initiate the reversal of hinge memory and to provide a sequence of micromirror states with a specified duty cycle to a light modulator in the array of light modulators; and
    a memory coupled to the controller to store usage history for at least one light modulator in the array of light modulators, and to store sequences of light modulator states for use in reversing hinge memory.

16. The system of claim 15, wherein the controller further comprises:
    a means for periodically sampling a state of each light modulator in the array of light modulators; and
    a means for computing a usage history value for each light modulator based on the sampling.

17. The system of claim 16, wherein the sequence provided to a light modulator is based on a usage history value for the light modulator.

18. The system of claim 15, wherein the controller further comprises:
    a means for periodically sampling an average state of each light modulator in the array of light modulators, wherein the average of a light modulator comprises an accumulated state value for the light modulator over a period required to at least one frame; and
    a means for computing a usage history value for each light modulator.

* * * * *